April 5, 1960 R. W. MAYHEW ET AL 2,931,141
FORMING GLASS ARTICLES
Filed Aug. 21, 1957 2 Sheets-Sheet 2

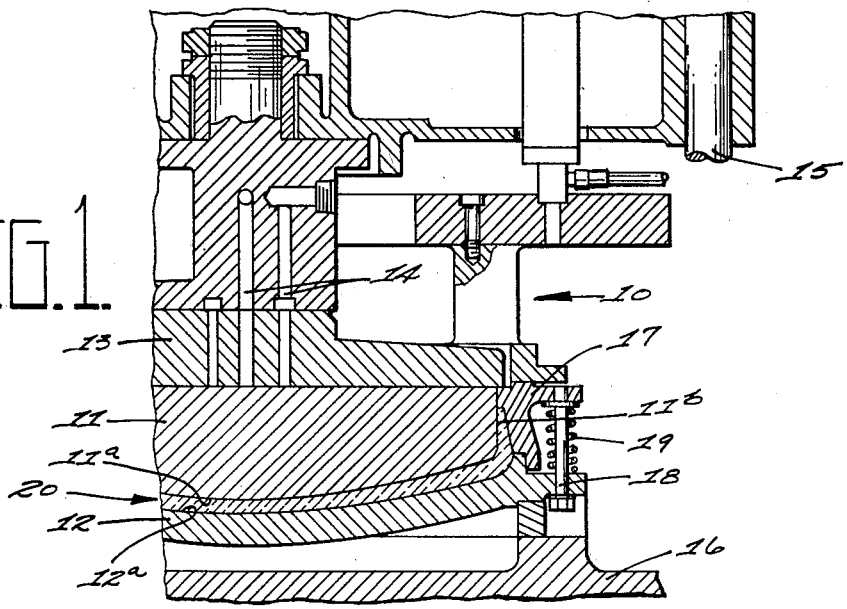
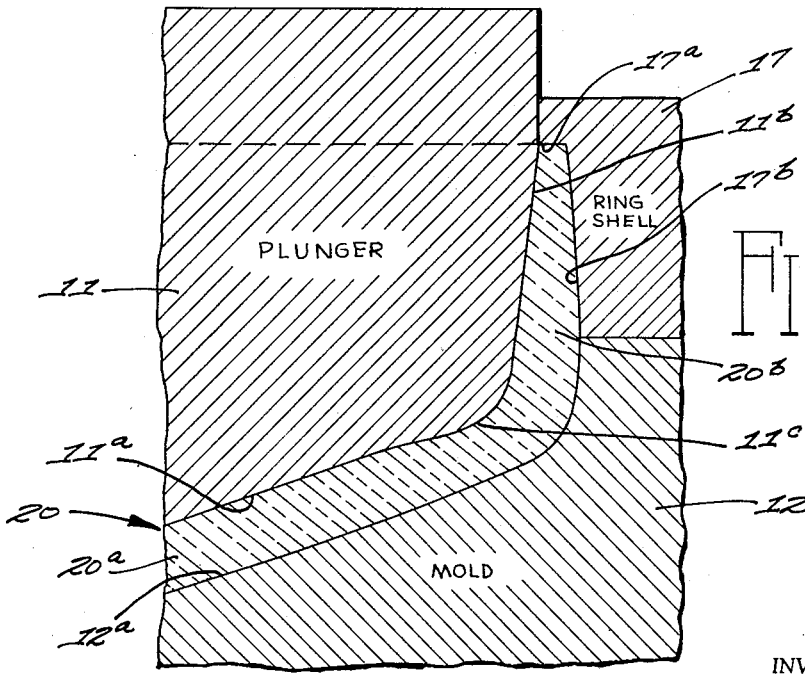

INVENTORS
R. W. MAYHEW
R. O. RUFF
R. L. VOGELPOHL
E. J. HOLLER &
BY W. A. SCHAICH
ATTORNEYS

United States Patent Office 2,931,141
Patented Apr. 5, 1960

2,931,141

FORMING GLASS ARTICLES

Ray W. Mayhew and Richard O. Ruff, Toledo, and Rol L. Vogelpohl, Curtice, Ohio, assignors to Kimble Glass Company, a corporation of Ohio Application August 21, 1957, Serial No. 679,352

8 Claims. (Cl. 49—85)

The present invention relates to a method of producing glass articles, particularly large glass articles of bowl-like character, which are suitable for use as component parts in the fabrication of cathode-ray tube envelopes, for example.

The invention is primarily associated with the manufacturing a hollow glass article such as the face plate portion of a cathode-ray television picture tube which in order to meet manufacturing requirements of the tube must have extremely precise dimensions and contours.

Concurrent with the introduction of colored television requirements for component parts for fabricating a picture tube envelope have become increasingly great due to distortion in viewed images which can result from minor discrepancies in part dimensions. These discrepancies were considered minor in character in the fabrication of monochromatic picture tube envelopes which require a lesser degree of preciseness in their fabrication.

A continuing problem in the field of press-forming the face plate member of an extremely precise tube envelope has been one arising out of distortion of a peripheral area of the viewing panel caused by a change in the pressed contour of the glass immediately following its formation. This distortion is more frequently observable in pressing large size face plates such as those employed in 21 diagonal inch tubes and larger. The mass of glass and the cross-sectional wall thickness required for a tube of this size and larger naturally are greater so that the glass which is pressed retains its heat for a longer period of time and thus is capable of deviation from its precisely pressed contour immediately following the pressing.

The problem arising out of distortion of hollow pressed face plates are related to the principle of "suck-up" which occurs immediately upon withdrawal of a plunger from contact with a newly-formed glass article remaining in the mold. The article has extensive areas such as an annular flange in which the glass has not sufficiently cooled to permanently maintain a precise contour. It may be theorized that an upwardly depending flange containing fluid glass in its interior exerts a hydrostatic effect on the interior glass immediately below causing deformation of its exterior surface. The downward pressure exerted by the considerable mass of internal fluid glass in combination with the low pressure existing within the article corner as the plunger withdraws tends to effect an elevating of the glass surface in the adjacent horizontal region into uncontrolled and objectionable dimensions.

Accordingly, a general object of the present invention is to provide a method of pressing glass which will compensate for "suck-up" of a portion of the finished glass article immediately upon withdrawal of a forming plunger.

Another object of the present invention is to provide a method of pressing large hollow glass articles having a concavo-convex viewing panel and a surrounding rim which will eliminate an increase in thickness at the perimeter of the viewing panel by counteracting the "suck-up" effect which occurs thereat upon separation of the plunger and the newly-formed article.

Another object of this invention is to provide a forming procedure for pressing large hollow glass articles having a concavo-convex viewing panel and a surrounding rim which plunger is capable of forming the concave surface of said article by the utilization of an annular shoulder design to counterbalance the effects of deformation of large glass articles thereat immediately following their initial fabrication.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the accompanying drawings:

Fig. 1 is a vertical sectional view of the mold and plunger mechanism embodying the principles of the invention.

Fig. 2 is an enlarged vertical sectional view of one portion of Fig. 1 showing the plunger and mold in cooperative relationship forming a glass article.

Figure 3:
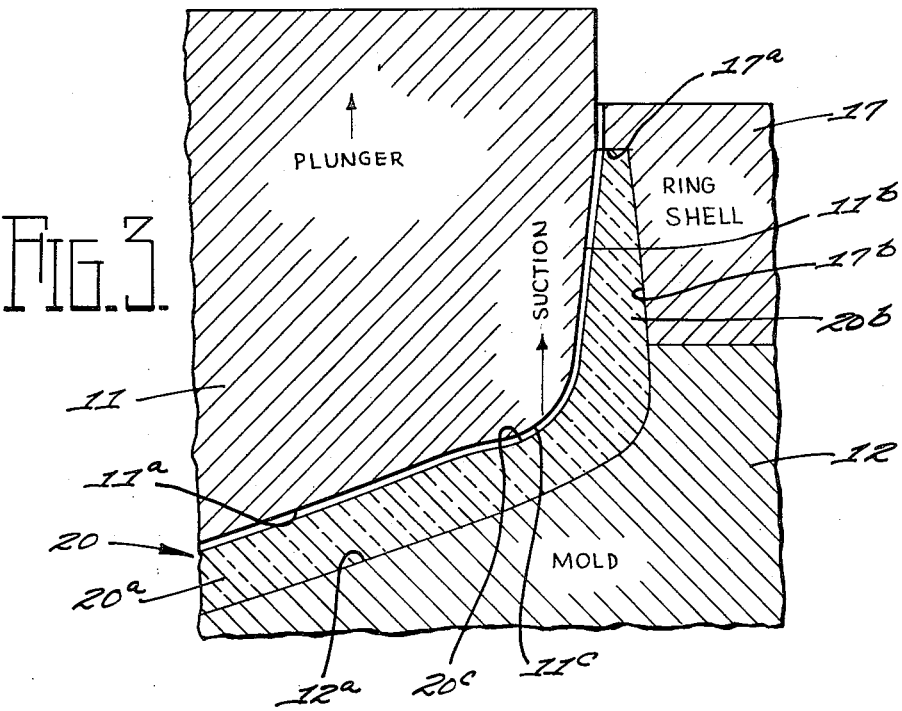
Fig. 3 is a view similar to Fig. 2, showing the plunger partially removed from contact with said newly-formed article.
Figure 4:
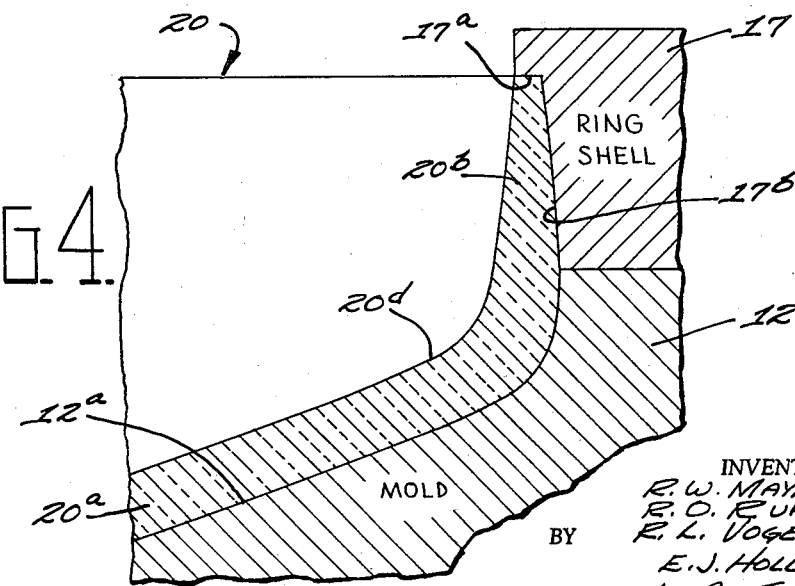
Fig. 4 is a view similar to Figs. 2 and 3, showing the plunger fully removed and the article reconstituted to desired configuration.

While this invention will be described as specifically applicable to the manufacture of a cathode-ray tube part, it will be apparent to those skilled in the art that the principles of the invention are equally applicable to the manufacture of any type of bowl-shaped glass article or part molded by press forming a molten charge of glass to the desired configuration as will be obvious from the following specification. The bowl-shaped article is generally one having a continuous rim or flange portion extending transversely around its central panel portion.

In a preferred embodiment of this invention, a glass forming press 10 is comprised of a vertically operable plunger 11 and a stationary mold 12. The plunger 11 is connected to the press head 13 which has central openings 14 therein adaptable to conducting a coolant to and from the plunger 11. The press head 13 is generally of a conventional nature suitable for reciprocating vertical movement upon stationary shafts 15 which control its vertical alignment.

Base plate 16 supports the mold cavity member 12 at a peripheral area thereof. Mold 12 has an upper surface 12a which is concavely contoured to the desired finish to be imparted to the molded article. Mold 12 has a shell ring 17 extending therearound which is capable of independent movement and separation from the mold for removal of the pressed article 20. Mold 12 has a plurality of vertical rods 18 extending upwardly from its perimeter upon which the shell ring 17 is disposed. A compression spring 19 surrounds each of the vertical rods 18 for resilient movement of the shell ring 17 into and out of firm contact with the upper mold surface during pressing. Press head 13 is thus able to reciprocate up and down in vertical alignment with the mold cavity contacting the upper surface of shell ring 17 at the bottom of its stroke. Each operation of the plunger 11 into the mold cavity is adaptable to fully forming a partially completed article in the present invention. All surfaces of the pressed article are in contact with plunger 11, mold 12 and shell ring 17 during pressing of glass article 20.

Plunger 11 has a relatively uniformly curved convex face 11a and a surrounding tapered side portion 11b. A slightly elevated area or shoulder 11c is located at the annular lower edge of the intersection of the convex central portion 11a and tapered side portion 11b. The amount of elevation incorporated into area 11c is a variable factor depending upon variations in the article shape and configuration and the particular type of glass being pressed. A considerable number of other factors are required for evaluation of the amount of shoulder increase.

Mold cavity 12 has a uniformly curved concave upper surface 12a which is adaptable to forming the convex surface of the pressed article. As stated, on the upper edge of mold cavity 12 is mounted a shell ring 17 capable of firm and continuous annular contact with the upper surface of the mold 12 during pressing to form the flange portion 20b of the pressed article 20. Shell ring 17 has a properly designed upper flange 17a and interior surface 17b which together with the plunger side wall 11b form the article with a tapering surrounding flange 20b. In Fig. 2, the plunger is shown in its lowered position in nearest relationship to mold 12 pressing the article 20 to the full extent of the hollow cavity.

Article 20 comprises a glass face plate adaptable for use as a component part of the cathode-ray tube envelope. Face plate 20 has a concavo-convex viewing portion 20a in its major central area and the surrounding flange 20b. During the pressing operation a peripheral zone of the face plate 20 is pressed to a lesser dimension than the relatively uniform thickness of the major central area of the viewing panel 20a. The upper surface of panel 20a at its periphery is pressed more deeply by greater penetration of the plunger shoulder 11c into the molten glass. A controlled restricted zone of prescribed dimensions is initially formed at the annular intersection of flange 20b and viewing panel 20a beneath plunger shoulder elevation 11c through which the fluidized internal glass within flange 20b tends to flow in an inward direction.

When the plunger 11 is initially withdrawn from contact with the newly-formed glass article by upper movement of the press head 13, a vacuum is created at the junction of the viewing panel 20a and annular flange 20b which tends to lift upwardly the glass in the area 20c. This is due to the great difference in pressure between the area of the plunger near the uppermost portion of shell ring 17 and the extremely low pressure area between the plunger shoulder 11c and the peripheral zone of the newly-formed face plate 20.

Shortly after separation of plunger 11 from the newly-formed face plate 20, the glass in flange area 20b being quite plastic on its interior, the peripheral zone 11c is elevated by the downward pressure exerted by this deformable glass and the vacuum created at plunger shoulder 11c by the plunger withdrawal as shown in Fig. 3. After plunger removal the peripheral zone 20c is then elevated into desired contour 20d which is essentially uniform with the concave inner face of viewing panel 20a. The separation of plunger area 11c from the cooled or chilled surface of the glass therebeneath causes the low viscosity inner glass of flange portion 20b to move downwardly at least partially into this region to cause an elevation of the upper glass surface 20d which is free to move.

"Suck-up" is a condition always tending to exist near corners in the surface of a cavity formed in glass by a plunger and occurs either at the time the plunger is withdrawn or shortly thereafter. As applied to press forming television cathode-ray bulb parts, such as the face plate, Fig. 2 shows in section the mold parts at the time just before plunger 11 is withdrawn. The glass surface is set at least through the thin "enamel" at its surfaces, but the interior is still quite soft and at a much higher temperature. As the plunger 11 is withdrawn as stated, the "suck-up" condition occurs.

Reasons for such occurrence may consist of a very considerable pressure differential being established between the peripheral upper surface of the newly-formed glass article and its outer extremities contacting portions of the plunger which separate firstly from the article. The pressure gradient may vary from atmospheric at the uppermost inner edge of shell ring 17 to near vacuum in the area between plunger shoulder 11c and the interior peripheral zone 20c of the article. This great pressure difference may tend to displace glass from the flange portion down around the corner and into peripheral zone 20c. The glass may also tend to adhere slightly to the plunger shoulder 11c tending to raise the glass in the corner region. Another possibility is that the so-called "enamel" on the surface of the newly-formed glass may resoften momentarily particularly where the section is heavy allowing the glass to settle and assume uncontrolled contours.

This invention provides a method whereby the plunger contour is corrected or compensated in a prescribed region by an amount equal and opposite to the "suck-up" shown in glass articles which have been press formed by a plunger without any correction or compensation built into its shoulder portion 11c. The compensating effect which is built into the plunger is opposite in the sense that where the glass tends to rise above the desired surface in conventional pressing, the plunger surface is elevated by an appropriate or approximately corresponding amount.

By measurement of a considerable number of pieces of pressed glass a statistical determination may be made of the profile or contour of glass due to a given plunger shape. Comparison of this contour with that desired in the glass point-by-point will then show the precise profile of the plunger which is required to give the desired glass surface.

The method as described has shown desirable results in the fabrication of glass face plates for use in color television picture tubes. Heretofore, the peripheral area of the face plates have possessed a greater thickness than desirable and thus a distortion of images at their periphery. The degree of tolerance which is allowable at the peripheral areas may be controlled by the above described method to produce more precisely dimensioned articles. Incorporated into the plunger shoulder for initial and positive control of the shaping of the internal peripheral area of the article may be a smoothly contoured raised band of the order of approximately 0.005 and 0.010 inch for a 21 inch circular face plate to correct for the amount of distortion which arises thereat when no compensation is incorporated into the plunger. Obviously, the dimensions of such a band may be varied through extensive limits depending primarily upon size and shape factors.

Various modifications may be resorted to within the spirit and scope of the appended claims.

We claim:

1. The method of compensating for peripheral "suck-up" in press forming a hollow glass article having a central viewing panel and a surrounding annular flange, which method comprises the steps of pressing the article with its outer and inner surfaces in contact with mold and plunger surfaces, respectively, forming an annular area of the inner surface of said viewing panel adjacent said annular flange to a lesser thickness than the central region of said panel during said pressing, and removing the said plunger whereby the plastic glass adjacent said thinner annular area flows into said annular area on separation of the molding surfaces to reform said annular area into a uniform viewing panel.

2. The method of compensating for peripheral "suck-up" in press forming a hollow glass article having a curved viewing panel and a surrounding upstanding annular flange, which method comprises the steps of pressing the article with its upper and lower surfaces in contact with mold cavity and plunger surfaces, temporarily forming an annular area of the upper surface of said article adjacent its annular flange into slightly recessed condition by said plunger during said pressing, withdrawing said plunger from contact with said article, whereby the plastic glass adjacent said recessed annular area flows thereinto to shape an essentially uniform curved viewing panel by the localized elevating effect created by withdrawal of said plunger.

3. The method of compensating for peripheral "suck-up" in press forming a hollow glass article having a cylindrically curved viewing panel and a surrounding annular flange, which method comprises the steps of initially pressing the article between a mold and a plunger with a viewing panel of substantially uniform central thickness and of lesser cross-sectional thickness in a peripheral zone adjacent said flange and contacting the plunger, all surfaces of said article being in contact with said mold and said plunger surfaces during said pressing, removing said plunger while portions of the article are still deformable, whereby the plastic glass adjacent said annular zone flows thereinto to attain a curved viewing panel of substantially uniform contour.

4. The method of compensating for peripheral "suck-up" in press forming a hollow glass article having a uniformly curved concavo-convex viewing panel and a surrounding annular flange, which method comprises the steps of pressing a charge of molten glass into a hollow glass article having all its outer and inner surfaces in contact with mold cavity and plunger surfaces, temporarily forming a peripheral zone of the inner surface of said viewing panel adjacent the said annular flange into lesser cross-sectional dimension than the major central portion thereof during said pressing, separating said plunger from contact with the newly-formed article, whereby the plastic glass of said peripheral zone flows to assume a thickness essentially equal to the major central portion of said viewing panel.

5. The method of compensating for peripheral "suck-up" in press forming a hollow glass article having a uniformly curved concavo-convex viewing panel and a surrounding annular flange in accordance with claim 3, wherein the depth of penetration of an annular peripheral portion of the plunger into the upper surface of the pressed glass is approximately 0.01 inch or less.

6. The method of forming a precisely-dimensioned concavo-convex hollow glass face plate for a cathode-ray tube envelope which comprises the steps of introducing a charge of molten glass into a mold cavity of prescribed configuration, pressing said charge of molten glass with a plunger into an initially formed face plate having a viewing panel of substantially uniform concavo-convex contour in its major central portion, and an annular flange surrounding said viewing panel, indenting a temporary peripheral zone of said viewing panel adjacent said flange portion and in the concave surface thereof of lesser cross-sectional thickness than the central portion thereof, immediately removing said plunger from contact with said initially-formed face plate, whereby the plastic glass of the peripheral zone of said viewing panel flows to assume a thickness essentially equal to its major central portion.

7. The method of forming a hollow glass face plate for a cathode-ray tube envelope in accordance with claim 6, wherein the depth of penetration of said plunger in its peripheral zone is approximately 0.01 inch or less over the uniformly convex contour of said plunger.

8. In a method of making a hollow glass article having a central portion of substantially uniform thickness and a surrounding flange by pressing molten glass between a mold and a plunger, the improvement which resides in the steps of temporarily reducing the cross-sectional thickness of the article at the annular area of juncture of the central portion of the article and the flange thereof during the pressing operation, only partially setting the molten glass while maintaining the plunger in contact therewith, and withdrawing the plunger from contact with the partially set article, the resultant pressure differential between the area of juncture and the flange effecting flow of the only partially set molten glass from said flange to said area to reform said area to substantially the thickness of the remainder of the central portion.

References Cited in the file of this patent

UNITED STATES PATENTS 2,328,404     White                  Aug. 31, 1943